United States Patent [19]

Fenn

[11] 3,987,143

[45] Oct. 19, 1976

[54] METHOD OF DECREASING HEAT LOSS FROM EXHAUST GASES OF AN INTERNAL COMBUSTION ENGINE

[75] Inventor: Gordon William Fenn, Mount Clemens, Mich.

[73] Assignee: Chrysler Corporation, Highland Park, Mich.

[22] Filed: June 5, 1975

[21] Appl. No.: 584,074

[52] U.S. Cl. .......................... 264/267; 29/156.4 R; 29/527.4; 60/272; 123/193 H; 164/76; 264/269

[51] Int. Cl.² .................... B29G 7/00; B23P 13/00; F01P 3/14

[58] Field of Search ............... 60/34, 272, 273, 274, 60/282; 123/52 M, 52 MC, 41.01, 41.17, 41.67, 41.71, 41.79, 41.82, 41.85, 191 R, 193 H, 193 CH; 264/259, 267, 269; 29/156.4 R, 527.2, 527.3, 527.4, 530, 527.5; 164/76

[56] References Cited

UNITED STATES PATENTS

| | | | |
|---|---|---|---|
| 2,260,656 | 10/1941 | Bell | 60/272 |
| 3,786,795 | 1/1974 | Kaneko et al. | 60/272 |
| 3,919,755 | 11/1975 | Kaneko et al. | 164/76 |

*Primary Examiner*—Willard E. Hoag

*Attorney, Agent, or Firm*—Talburtt & Baldwin

[57] ABSTRACT

The method comprises introducing a mixture of uncured epoxy resin and curing agent in a coolant passage adjacent an exhaust passage and curing the resin into a solid insulating layer against the walls of the coolant passage.

3 Claims, 1 Drawing Figure

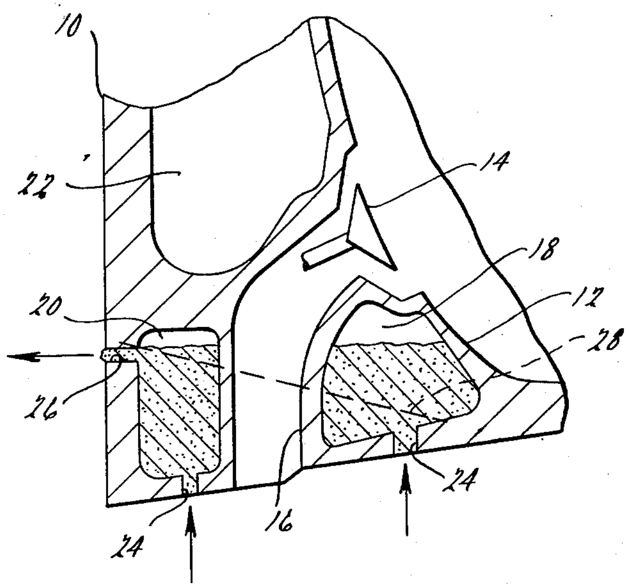
10
22
14
18
20
12
28
26
24
16
24

METHOD OF DECREASING HEAT LOSS FROM EXHAUST GASES OF AN INTERNAL COMBUSTION ENGINE

BACKGROUND AND SUMMARY OF THE INVENTION

This invention relates to engine cylinder heads and more specifically is directed to a novel arrangement for thermally insulating an exhaust outlet in an engine cylinder head by providing a thermal insulator in a coolant passage adjacent the exhaust outlet.

In order to reduce the level of undesirable emission products in the exhaust of internal combustion engines and in improving the efficiency of the engine, it has been found desirable to limit the maximum temperature in the combustion chamber during combustion. However, it has now also been found desirable to keep the temperature of exhaust gases high once the gases leave the combustion chamber. Current engine cylinder head designs provide a coolant passage around the exhaust outlet passage from the combustion chamber and thus promote heat rejection from the exiting exhaust gases as soon as they leave the combustion chamber.

The present invention arises in part through the discovery that heat rejection by the exiting exhaust gases can be controlled and minimized immediately upon exiting the combustion chamber. The present invention accomplishes this by filling the coolant passage around the exhaust outlet passage in the cylinder head with a mixture of uncured epoxy resin and a curing agent, which is allowed to cure into a solid thermal insulator around the exhaust passageway either entirely or around selected portions thereof. The invention provides an uncomplicated and economical way of achieving the desired objective of minimizing heat rejection by the exiting exhaust gases before they are discharged through the exhaust system to the atmosphere.

The present invention is disclosed with reference to the ensuing description and claims and the accompanying drawing which describe and illustrate a preferred embodiment of the present invention according to the best mode presently contemplated in carrying out the invention.

BRIEF DESCRIPTION OF THE DRAWING

The drawing illustrates a cross-sectional view through a portion of an engine cylinder head.

DESCRIPTION OF THE PREFERRED EMBODIMENT

In the drawing, a cylinder head 10 includes one or more combustion chamber domes 12, an exhaust valve 14, an exhaust passage 16 and coolant passages 18, 20 and 22. This much of the cylinder head represents a well-known construction and further details thereof are unnecessary for understanding the present invention. Specific details of the design, shape, etc. of these structural features will depend upon the specific engine design. Suffice it to say that the coolant passages 18, 20 and 22 customarily contain engine coolant which circulates therethrough to cool the cylinder head around the combustion chamber dome 12 and the exhaust passage 16.

According to principles of the present invention, a mixture of uncured epoxy resin and a curing agent therefor is introduced into one or more of the coolant passages around the exhaust outlet to form, when cured, a thermal insulator for the exhaust passage. An especially good way for accomplishing this is to orient the cylinder head as shown in the drawing (which is rotated at 90° from the typical position in an engine) and providing the cylinder head with one or more mixture injection passages 24 via which the mixture of epoxy and curing agent may be introduced. The invention possesses a high degree of versatility in that the amount of mixture introduced into the passages may be selectively controlled to achieve a desired coverage of resulting insulation. By providing one or more overflow passages at selected locations such as at 26, the fill level may be accurately established by discontinuing the introduction of mixture into the injection passages when an overflow of mixture occurs. The drawing illustrates a condition where the two passages 18 and 20 totally surround the wall of the exhaust passage. It should be appreciated that any of a number of techniques for selectively filling the coolant passages are available and usage of a particular one will depend upon the particular design of the cylinder head. Thus, the extent of insulation around the exhaust outlet passage can be well-controlled but will depend upon both the shape of the coolant passages and the chosen locations of the injecting passages 24 and of the overflow outlets 26. As an example, it would be possible to incline the cylinder head about a vertical axis so that the mixture of epoxy and curing agent would fill to a level indicated at 28. It is contemplated that the cured epoxy may be suitable by itself for plugging passages 26 and 24.

The invention exhibits even further versatility when the large number of potentially available epoxy resins and curing agents is considered. While dimensional stability, low thermal conductivity, room temperature curability, and chemical inertness are some of the general attributes of epoxy resins, specific epoxy resins and curing agents may be selected in accordance with known formulations to obtain the optimum product for a given installation. Thus the invention provides an economical, useful arrangement for insulating the exhaust passage of an existing engine cylinder head.

What is claimed is:

1. The method of decreasing heat loss from exhaust gases of an internal combustion engine having a coolant passage separated from an exhaust outlet passage by a wall in a cylinder head thereof, comprising: introducing a mixture of uncured epoxy resin and a curing agent therefor into said coolant passage so that the mixture is in contact with said wall; and permitting the mixture to cure into a solid thermal insulating element against said wall.

2. The method according to claim 1 wherein an inlet for said mixture is provided in said cylinder head to intersect said coolant passage.

3. The method according to claim 1 wherein an overflow outlet is provided in said cylinder head intersecting said coolant passage.

* * * * *